(No Model.)

H. A. RUETER.
ALE AND BEER CASK.

No. 306,527. Patented Oct. 14, 1884.

Witnesses
Ch. Houghton
Fredk L. Houghton

Inventor
Henry A. Rueter

UNITED STATES PATENT OFFICE.

HENRY A. RUETER, OF BOSTON, MASSACHUSETTS.

ALE AND BEER CASK.

SPECIFICATION forming part of Letters Patent No. 306,527, dated October 14, 1884.

Application filed November 26, 1883. (No model.)

*To all whom it may concern:*

Be it known that I, HENRY A. RUETER, of Boston, in the county of Suffolk and Commonwealth of Massachusetts, have invented a new and useful Improvement in Ale and Beer Casks, of which the following is a specification.

My invention relates to the tap-hole of the cask, the object being to provide means and method of securely closing it to prevent ingress of air after the cask is emptied by the consumer and the faucet is removed; and it consists in the devices described below for that purpose. When a consumer has emptied a cask of ale or beer and removed the faucet, if the tap-hole is not closed the atmospheric effect upon the remnants left within the cask is such that they soon become sour, musty, and then moldy, and the cask is greatly injured and often wholly spoiled. Most brewers incur large losses in this way.

Figure 1:
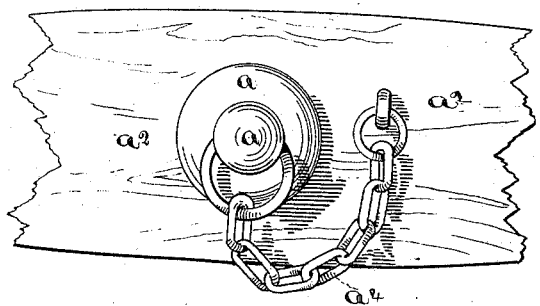
Figure 2:
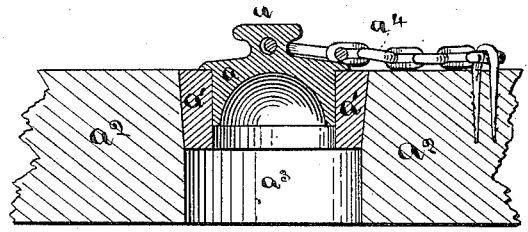

In the drawings annexed, Figure 1 shows an outside view of a piece of the head of a cask in which the tap-hole is located, with the device for stopping the tap-hole in it. Fig. 2 shows a sectional view of a piece of the head of a cask in which the tap-hole is located, through the center of the tap-hole, and a section of the device for stopping the tap-hole in place, and a segment of a lining in the tap-hole between it and the stopper device.

$a$ is a metallic stopper chambered in the center of its inner end to make it lighter, and having a shoulder at its outer end to prevent its being driven in too far, and a knob with a hole in it, through which a ring or chain-link is passed and welded.

$a'$ represents a section of an interchangeable lining in the outer end of the tap-hole. The tap-hole will have the form of a frustum of a cone or spheroid about half its length at its outer end, and the interchangeable lining will conform to it in shape, so that it cannot be forced too far into the tap-hole. This interchangeable lining will generally consist of the outer end of a combined tap-hole bushing and plug, (the subject of another application for a patent by me already allowed,) the inner end of which was forced away when the faucet was driven into place in tapping the barrel. The object of this interchangeable lining in the tap-hole is to preserve the tap-hole from injury by the driving and loosening the faucet, and by the driving and withdrawing the stopper device $a$. Before the cask is refilled this interchangeable lining is removed and a new bushing and plug placed in the tap-hole.

$a^2$ shows the wood of the head of the cask.

$a^3$ shows the inner end of the tap-hole.

$a^4$ is a chain, one end link of which is welded through the knob on the stopper $a$, and the other links of which are all welded or otherwise secured, so that the chain cannot be broken by hand. The other end of the chain is secured to the head of the cask by a staple driven into the wood, or by other suitable device. This chain retains the stopper $a$ always near the faucet and tap-hole, ready for use when the faucet is removed from the tap-hole. The removal of the faucet does not displace the interchangeable lining $a'$, but leaves it in the tap-hole, ready to receive and hold the stopper $a$, which upon the removal of the faucet is immediately driven into its place, thus closing the cask against the ingress of air, in which condition it remains without injury until wanted for use again. Thus I provide a stopper which, with the interchangeable lining, is always at hand, ready to close the tap-hole when the faucet is removed, and which, with the lining, may be used an indefinite number of times without in the least changing the form of or otherwise injuring the tap-hole, thereby preventing the spoiling of casks by mold, and securing as long a life for the head-piece in which the tap-hole is located as any other part of the cask may have.

I claim as new and of my invention—

In an ale or beer cask, in combination, the head-piece $a^2$, the interchangeable lining $a'$, the stopper $a$, and the chain $a^4$, all substantially as described, for the purpose specified.

HENRY A. RUETER.

Witnesses:
 CHS. HOUGHTON,
 FREDK. L. HOUGHTON.